United States Patent [19]
Campbell

[11] 3,761,109
[45] Sept. 25, 1973

[54] SUSPENSION SYSTEM FOR VEHICLES
[75] Inventor: William J. M. Campbell, Elkhart, Ind.
[73] Assignee: Elkhart Bridge & Iron, Inc., Elkhart, Ind.
[22] Filed: Nov. 8, 1971
[21] Appl. No.: 196,683

[52] U.S. Cl................ 280/124 R, 188/2 A, 267/20
[51] Int. Cl............................................. B60g 11/52
[58] Field of Search.................. 280/124 F; 267/20, 267/21; 188/2 A

[56] References Cited
UNITED STATES PATENTS
| | | | |
|---|---|---|---|
| 3,337,005 | 8/1967 | Stiefvater | 188/2 A |
| 2,184,188 | 12/1939 | Hinshaw | 267/20 R |
| 3,400,947 | 9/1968 | Cottrill | 267/20 R |

Primary Examiner—Philip Goodman
Attorney—John A. Young

[57] ABSTRACT

A suspension system for vehicles includes a lever mounted on a lug of the vehicle frame. The lever has a vehicle wheel mounted for rotation on an axle which is constructed transversely to one of the ends of the lever and a nonrotatable axle flange supports a brake for controlling rotation of the wheel. The lever has at its opposite end two opposed resilient means, one of the resilient means cushions the wheel to absorb both the weight of the vehicle and the ground reaction forces in one direction, and the other resilient means opposes wheel movement in a downward direction so it will not easily descend into chuckholes or the like thus adding stability to the wheel.

The resilient means can be in many different forms: among those contemplated are opposed springs of substantially different spring rate, the larger spring rate being to support the vehicle and the smaller spring rate being to oppose dropping of the wheel into chuckholes, ruts or the like. In place of springs, there is also contemplated for usage elastomeric members (known as "Ensolite") which are provided in stacks within a cylinder mounted for limited angular movement which provides a cushioning force for the wheel and also opposes movement of the wheel downwardly as previously described.

The lever has an adjustment between the resilient means and the lever end associated with the resilient means so as to control the position of the wheel relatively to the frame.

4 Claims, 7 Drawing Figures

INVENTOR
WILLIAM J. M. CAMPBELL
BY John A. Young
ATTORNEY

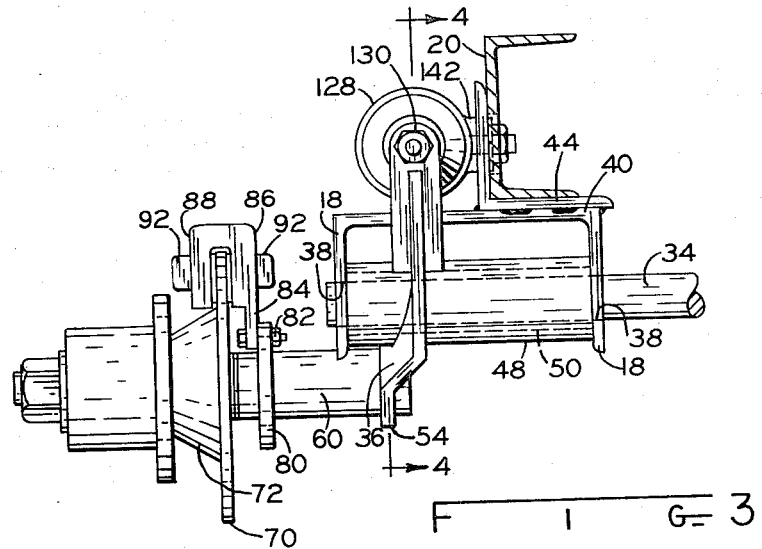
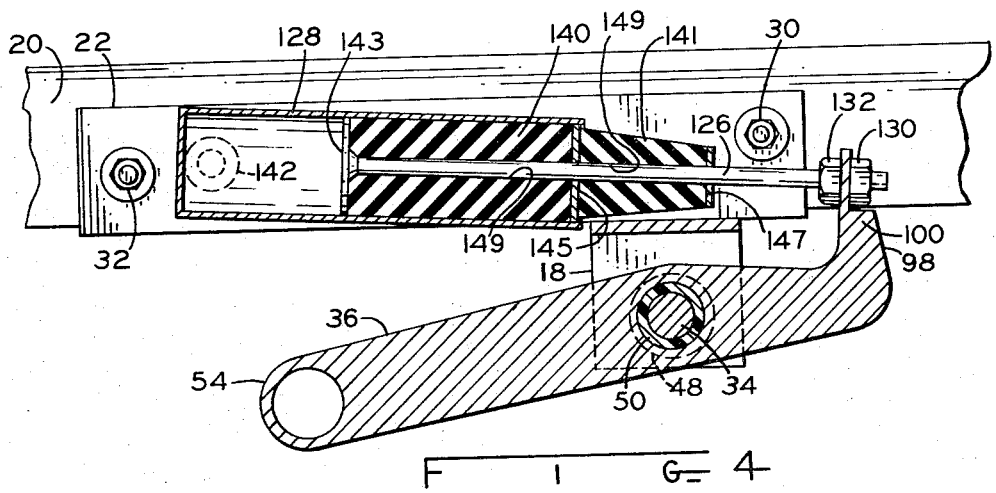
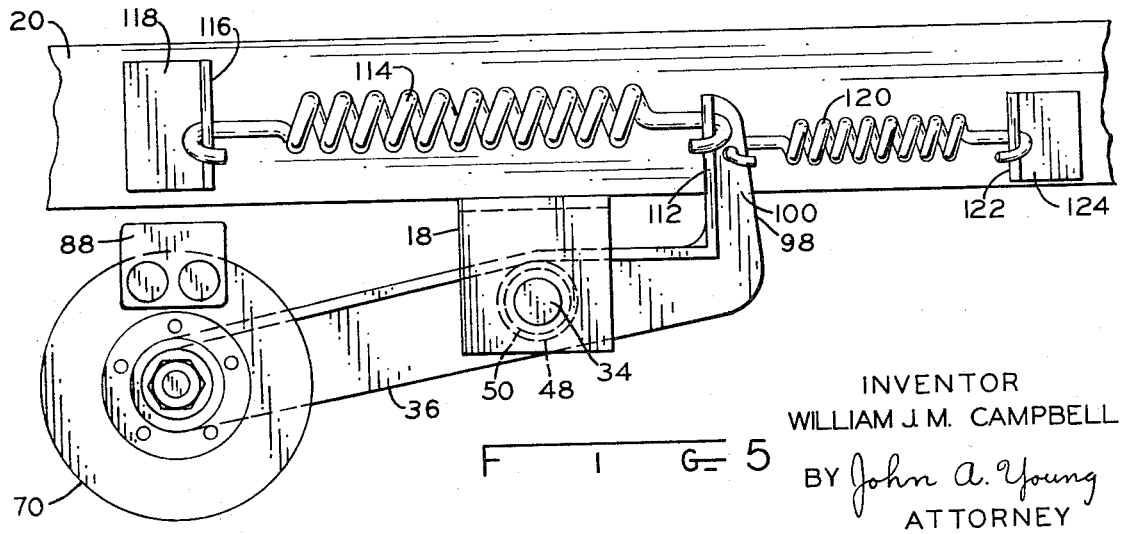

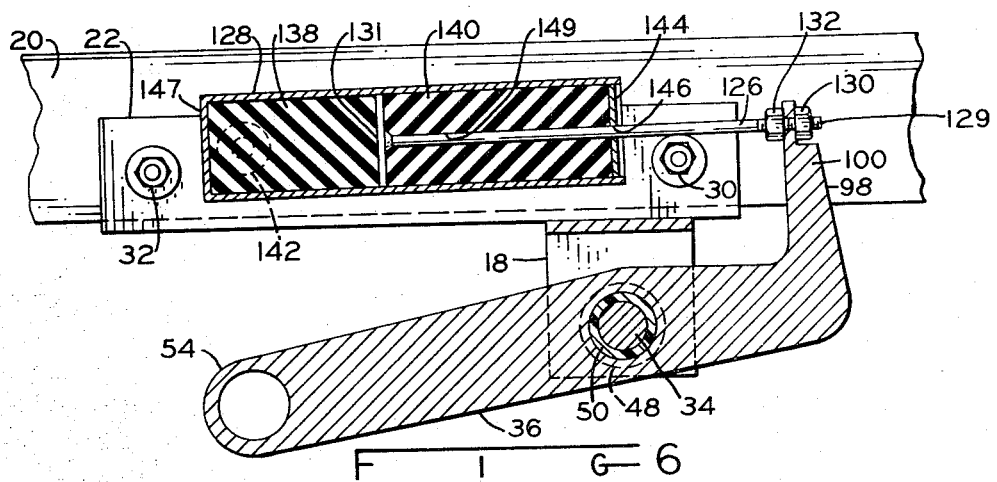
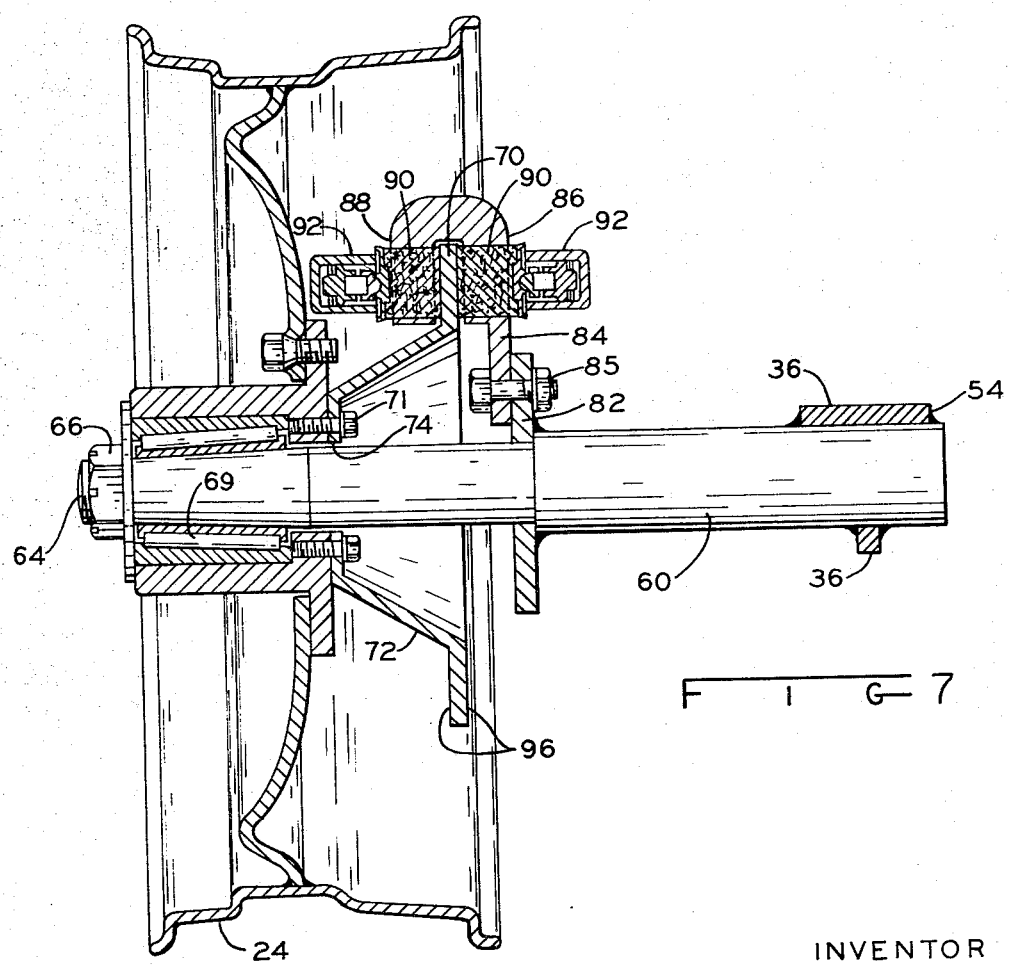

3,761,109

SUSPENSION SYSTEM FOR VEHICLES

BACKGROUND OF THE INVENTION

In recreational vehicles, there has been a substantial demand for an adequately braked and suspended wheel. Recreational vehicles are driven by motorists who are much accustomed to conventional passenger cars and they frequently fail to take into account the heavier loads and lower stability of recreational vehicles when they are towed in tandem or are mounted on a truck.

What is needed, is a much improved suspension system for recreational vehicles which will adequately cushion the vehicle against road shock and which will remain in a stable position behind the towing vehicle regardless of impacts which occur when the towed vehicles are being pulled over any rough or irregular terrain.

Moreover, a new and improved braking system must be devised to control the wheels of the towed vehicle so that the motorist has the towing and towed vehicles under better control. Substantially equalized braking is required in order to prevent unstable steering and unstable braking stops. Again it is emphasized that the motorist who is driving a recreational vehicle is not used to the extra weight and extra precautions which must be taken because of the greater inertia and therefore the present invention fully intends to correct this dangerous condition by providing a braking means which is a part of the suspension system whereby the vehicles can be driven over a variety of different highways and terrains and yet enabling the motorists to keep the driven vehicle under closer control both from a braking and from a suspension standpoint. Recreational vehicle equipment is an expensive item in itself and it is intended to safeguard the motorists, passengers and equipment against accidents which result directly from poorly suspended and poorly braked vehicle as has frequently happened in the past.

OBJECTS OF THE INVENTION

One of the objects of the present invention is to provide a new and improved suspension system for recreational vehicles and the like wherein the suspended wheel is cushioned against road shocks and is also prevented from substantial downward movement under its own weight when the vehicle is driven over chuckholes and the like. Consequently, the vehicle is more stable when being driven over rough terrain.

It is a further object of the present invention to provide a novel suspension system which incorporates caliper disc brake means to control rotation of the vehicle wheel and which will be substantially fade free and responsive to the brake pedal in a controllable manner.

It is a still further object of the present invention to provide a novel suspension system for recreational vehicles which incorporates resilient means for cushioning shock loads from the highway or other terrain to the recreational vehicle to make a smoother ride which is less prone to produce damage either to the recreational vehicle or to the contents of the vehicle.

A still further object of the present invention is to provide a novel suspension system in the form of a lever which is pivotally mounted on the frame and which supports the vehicle wheel at one end and is operatively associated with resilient means at its other end whereby the vehicle wheel is resiliently supported.

An important feature of the present invention is that the suspension system includes a novel adjuster for locating the vehicle wheel in a vertical sense relatively to the frame in order to adjust for heavier loads for either "high ride" or "low ride" depending upon vehicle loading and motorist preference.

Other objects and features of the present invention will become apparent from a consideration of the following description which proceeds with reference to the accompanying drawings.

DRAWINGS

Figure 2:
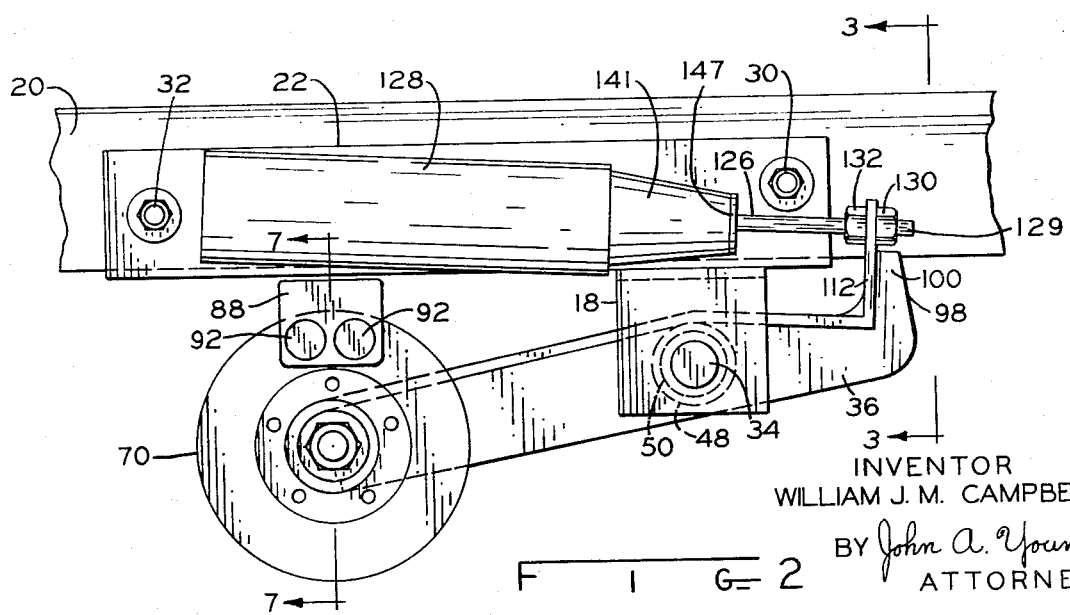
FIG. 2 is a side elevation view of the suspension system.

FIGS. 3 and 4 are sectional views taken on line 3—3 in FIG. 2 and 4—4 in FIG. 3;

FIG. 5 is a detail view of the resilient means for supporting the vehicle wheel and being illustrated in the form of two coil springs;

FIG. 6 is a further embodiment of the invention using elastomeric blocks in place of the springs in FIG. 5; and, FIG. 7 is a section view taken on line 7—7 of FIG. 2 to illustrate the mounting and braking means for the vehicle wheel.

WORKING EXAMPLE OF THE INVENTION

Figure 1:
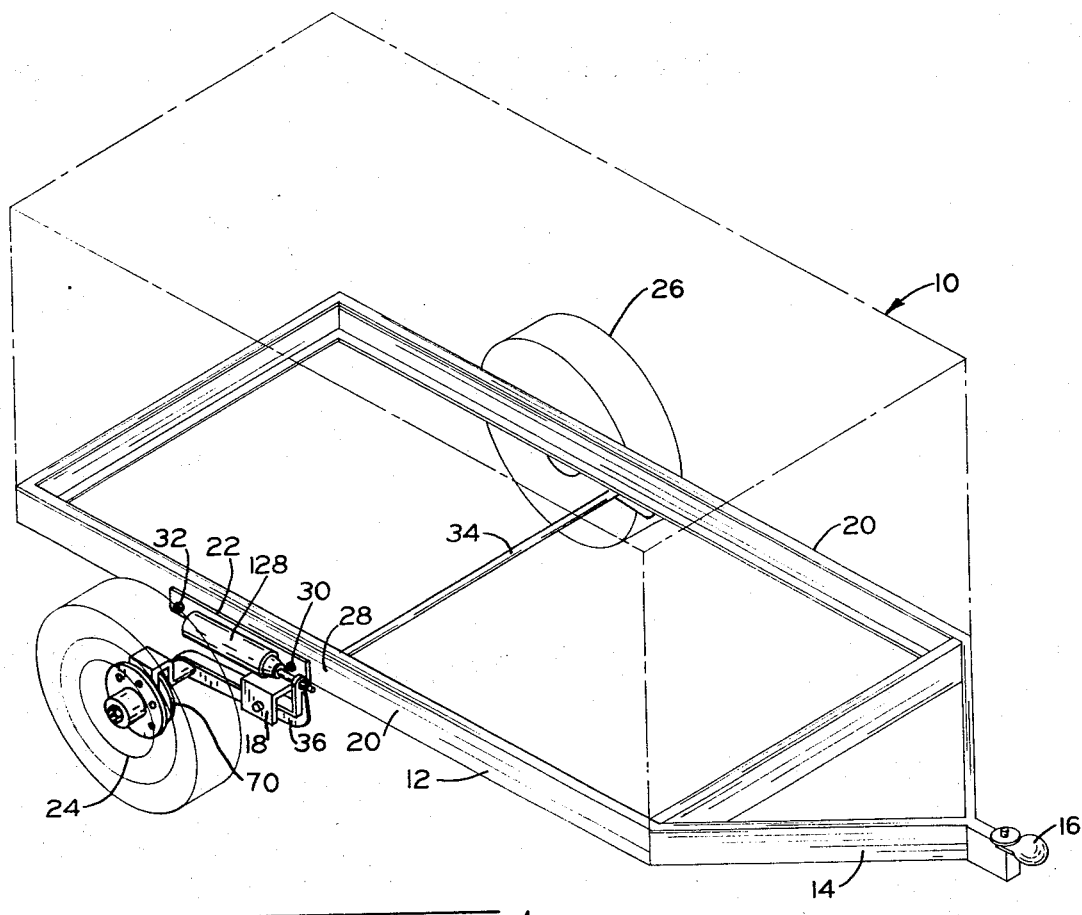
FIG. 1 is an isometric view of a vehicle frame and illustrating the suspension system with one of the wheels being shown in phantom view to better illustrate the suspension and braking system.

Referring to FIG. 1, there is illustrated a recreational vehicle designated generally by reference numeral 10 which is mounted on a frame 12 with forward end 14 of the frame having a tow connection with the vehicle (not shown). The frame has a depending set of lugs 18 formed from channel 40, one on each side member 20 of the frame to form a support connection between the frame 12 and two vehicle wheels 24, 26. The depending lugs 18 and channel 40 may be welded to lug 44 of an angle 22 which is secured to the side member 20 by bolts or the like 30, 32. On the depending lugs 18 is a pivot pin 34 on which is pivotally mounted a lever 36. The pivot pin 34 as illustrated in FIG. 3, is held at spaced ends in the depending spaced lugs 18 through aligned openings 38, in the two lugs 18.

Referring to FIGS. 2 and 3 the lever 36 has a mounting sleeve 48 which is received on a bearing 50 to provide for relatively free pivotal movement of the lever 36 on its mounting pin 34. Lever 36 has one end 54 which is adapted for mounting a transverse axle 60. The axle 60 has a threaded end 64 and a mounting nut 66 which clamps the wheel 24 to the axle 60. A bearing 69 supports the wheel on the axle and a brake rotor 70 is fixed to the wheel through bolts 71 and flange 74 and conical section 72.

The relatively nonrotatable axle 60 supports the wheel 24 and both in turn are supported on end 54 of lever 36. The axle 60 has a flange 82 which mounts a caliper housing 84 through bolts 85. The caliper 84 has two limbs 86 and 88, each limb having a friction member 90 which is activated by a hydraulic motor 92, mounted in the respective limbs, to effect a forcible engagement of the associated friction element 90 against the confronting surfaces 96 of the rotor 70. The brake thus controls rotation of the wheel.

The specific brake construction does not form a part of the present invention and as a working example of one form of the brake, reference may be made to Reissue U.S. Pat. No. 24,870 issued Sept. 20, 1960 and titled "Vehicle Brake." At end 98 of lever 36 is a finger section 100 which is reinforced by means of a web 112. The web also extends through the length of the lever to provide reinforcement against bending and or other distortion. The finger 100 has secured to it a heavy duty spring 114 (FIG. 5) which is fixed between the finger 100 and attachment flange 116 secured by transverse portion 118 to the side member 20 and a second spring 120 which is likewise fastened between the finger 100 and a second flange 122 secured by portion 124 to side member 20. As shown in FIG. 5, the spring 114 is substantially greater in size than is spring 120 since the purpose of the spring 114 is to resist, and cushion movement of the lever 36 in a clockwise direction (FIGS. 2, 5) about pivot 34 and thereby sustain the weight of the vehicle and provide cushioning for the vehicle against ground reaction forces which occur during normal transport of the vehicle. This spring also cushions the vehicle against excessive reaction forces which occur when the vehicle 10 is being transported over rough or irregular terrain.

The function of spring 120 is to yieldably oppose counterclockwise movement of the lever 36 about pivot 34 (FIGS. 2, 5) this normally occurring when the wheel tends to "drop" away from the vehicle as is the case when the vehicle is traveling over chuckholes or the like. Since, in this latter case it is only necessary to support the weight of the wheel and its associated structure spring 120 does not have to be as great in size as spring 114. The spring 120 does not sustain heavier loads which occur from supporting the vehicle and the usual forces which occur from ground reaction as it passes over rough or irregular terrain. To protect the springs 114, 120, they can be encapsulated within a tube or the like (not shown) but this is a design detail which is not essential.

Referring to FIG. 4, a rod 126 extends into a cylinder 128 and is secured to end 100 of lever 36 by means of nuts 130 and 132 received on its threaded end. Two blocks 140 and 141 of resilient material composed of "Ensolite" are provided to cushion the wheels 24. The cylinder 128 is pivoted at 142 to permit the lever 36 to move angularly about its pivot pin 34. The rod passes through aligned openings 149 in blocks 140, 141. The vehicle weight and road shocks are resisted by block 140 which is compressed by clockwise movement of the lever tending to foreshorten the distance between abutment 143 carried by rod 126 and the end wall 145 of cylinder 128. Clockwise movement of the lever 36 is resisted by block 141 which is compressed between end wall 145 and a transverse abutment 147 carried by the rods 126.

The wheel position is adjusted by means of the nuts 130, 132 on rod 126 which are moved back and forth to determine the angular position of the lever 36 and thus the vertical position of the wheel relative to the frame.

In a further embodiment of the present invention, (FIG. 6) in place of the springs 114, 120 the finger 100 (FIGS. 2, 4) utilizes a rod 126 having a threaded end 129 which is clamped by means of nuts 130, 132 to the rod. The rod 126 passes into a cylinder 128 and has an abutment 131 in the form of a transverse head received between two stacks 138, 140 of elastomeric blocks composed of "Ensolite" (FIG. 6) which yieldably resist movement of the lever in either pivotal direction of movement (clockwise or counterclockwise) [FIG. 6] about pivot 34. The lever and its mounting as indicated in FIG. 6 may be the same as in the previous embodiment.

The cylinder 128 is pivotally mounted by pivot 142 so that it can move about its pivot 142 responsively to lever movement. The end of the cylinder has an end wall 144 and opening 146 to permit the rod 126 to move reciprocably therein and another end wall 147. The stack of elastomeric members 140 is centrally apertured 146 to receive the rod 126.

OPERATION

In operation, rotation of the wheel 24 is controlled by means of the brake (FIG. 7), fluid pressure being communicated to motor actuators 92 mounted in limbs 86 and 88 to cause the friction elements 90 to forcibly engage and thereby clamp the respective confronting surfaces 96 of the rotor 72 therebetween. Since the rotor 72 is connected to the wheel mounting 74, rotation of the wheels 24 is thereby also controlled.

Under the weight of the vehicle and responsively to road shock, wheel 24 will move upwardly causing the lever 36 to pivot in a clockwise direction (FIG. 2) against the resistance of the spring 114 in the embodiment shown in FIG. 5 and against the yieldable resistance of the stack of elastomeric members 140 in FIGS. 4 and 6. This resilience provides a cushioning effect which absorbs road shock while at the same time permitting a slight movement of the wheel in an upward direction to absorb a major part of the road shock. In passing over ruts and the like the vehicle wheel 24 tends to drop slightly but this is resisted in case of the embodiment shown in FIG. 5 by means of a spring 120 and in FIGS. 4 and 6 by means of the elastomeric members 138 or 141 which tend to resist counterclockwise movement of the wheel about the pivot pin 34 and preventing drop of the wheel 24 into any depressions.

From the foregoing description, it can be seen that the vehicle wheel is both resiliently mounted and braked by means of the described lever construction and the mounting location of the wheel relatively to the frame is adjustable by means of the nuts 130, 132 which can be adjustably moved back and forth on the threaded end 129 of the rod 126 in order to control the angular position of the lever 36 and thus the position of the wheel.

Although the present invention has been illustrated and described in connection with a few selected example embodiments it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. In a suspension system for vehicles, a frame, a mounting lug received on said frame, a lever having pivotable movement on said lug, a transverse axle at one end of said lever, a vehicle wheel mounted on said axle and providing ground support for the vehicle, non-rotatable braking means located on said axle for controlling vehicle wheel rotation, and resilient means operatively associated with the other end of said lever, said resilient means including heavy duty means for resisting lever movement in a direction opposing ground reaction force in a direction providing vehicle support, and a lower magnitude means for resisting lever pivoting providing vehicle wheel movement in a downward direction, wherein said braking means is comprised of a caliper brake including a relatively fixed U-shaped housing having limbs, a nonrotatable friction member supported for axial movement one in each of said limbs, hydraulically operative actuating means for urging said friction members together, and a rotor having opposite faces each engageable by one of said friction members and rotatable with said wheel to control rotation of said wheel.

2. The suspension system in accordance with claim 1 wherein said resilient means includes an elastomeric member, a rod operatively connected at one end of said lever and having a portion bearing against said elastomeric means to yieldably oppose movement of the lever in either direction, and including a cylinder for receiving said elastomeric members, means for pivotally mounting said cylinder for limited angular movement thereof, abutment means disposed within said cylinder and bearing thereagainst in each of opposite directions, and means operatively connecting said abutment means with said lever to yieldably resist lever movement in either of its two opposite pivotal movements.

3. The suspension system in accordance with claim 1 wherein said resilient means is in the form of two springs mounted in opposed relationship, the one spring being substantially greater in spring rate than the other spring and operating in a direction opposing ground reaction forces and the other of said springs opposing lever movement in a direction in which the wheel moves away from the frame.

4. The suspension system in accordance with claim 1 wherein said resilient means includes an elastomeric member, a rod operatively connected at one end of said lever and having a portion bearing against said elastomeric means to yieldably oppose movement of the lever in either direction.

* * * * *